No. 856,889. PATENTED JUNE 11, 1907.
C. F. LAMP.
ANIMAL TRAP.
APPLICATION FILED NOV. 19, 1906.

2 SHEETS—SHEET 1.

WITNESSES: Charles F. Lamp, INVENTOR.

By C. A. Snow & Co.

ATTORNEYS

No. 856,889. PATENTED JUNE 11, 1907.
C. F. LAMP.
ANIMAL TRAP.
APPLICATION FILED NOV. 19, 1906.

2 SHEETS—SHEET 2.

WITNESSES:

Charles F. Lamp, INVENTOR.

By C. A. Snow & Co.
ATTORNEYS

UNITED STATES PATENT OFFICE.

CHARLES F. LAMP, OF DURANT, IOWA.

ANIMAL-TRAP.

No. 856,889.     Specification of Letters Patent.     Patented June 11, 1907.

Application filed November 19, 1906. Serial No. 344,117.

*To all whom it may concern:*

Be it known that I, CHARLES F. LAMP, a citizen of the United States, residing at Durant, in the county of Cedar and State of Iowa, have invented a new and useful Animal-Trap, of which the following is a specification.

This invention relates to animal traps and more particularly to devices of this character known as self-setting traps.

The object of the invention is to provide an efficient device which will cut the animals springing the trap so as to kill them and at the same time throw them away from the trap whereby the further operation of the device will not be interfered with.

Another object is to provide a trap of this character which can be sprung by an animal approaching it from either side.

With these and other objects in view the invention consists of certain novel features of construction and combinations of parts which will be hereinafter more fully described and pointed out in the claims.

In the accompanying drawings is shown the preferred form of the invention.

Figure 1:
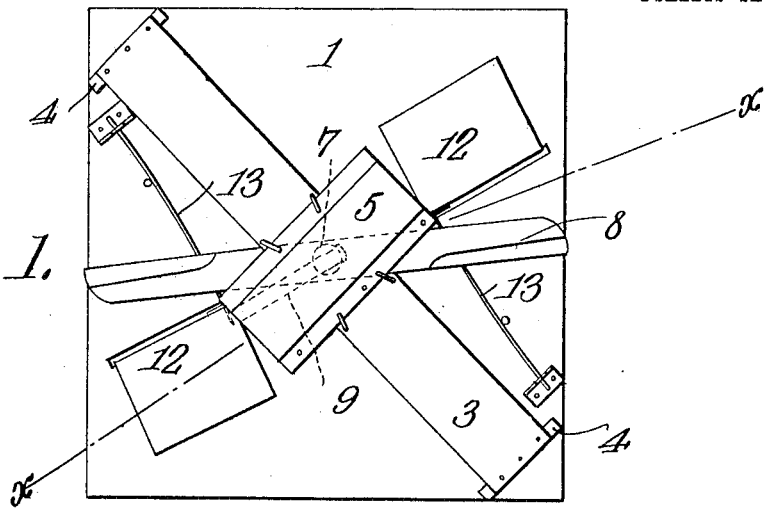
Figure 3:
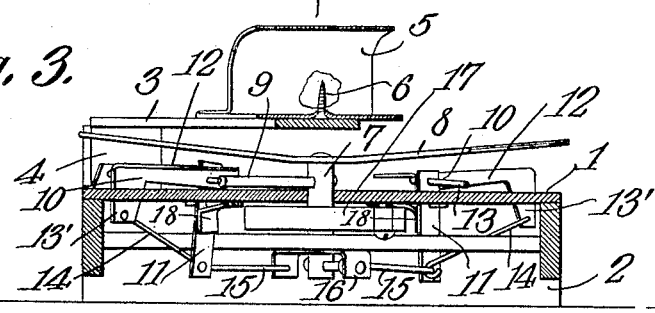
Figure 2:
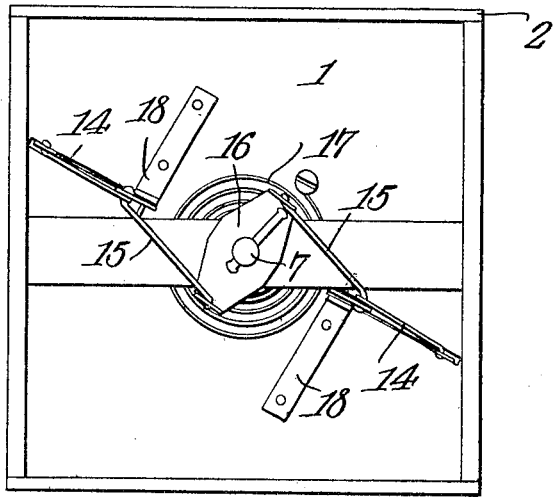
Figure 5:
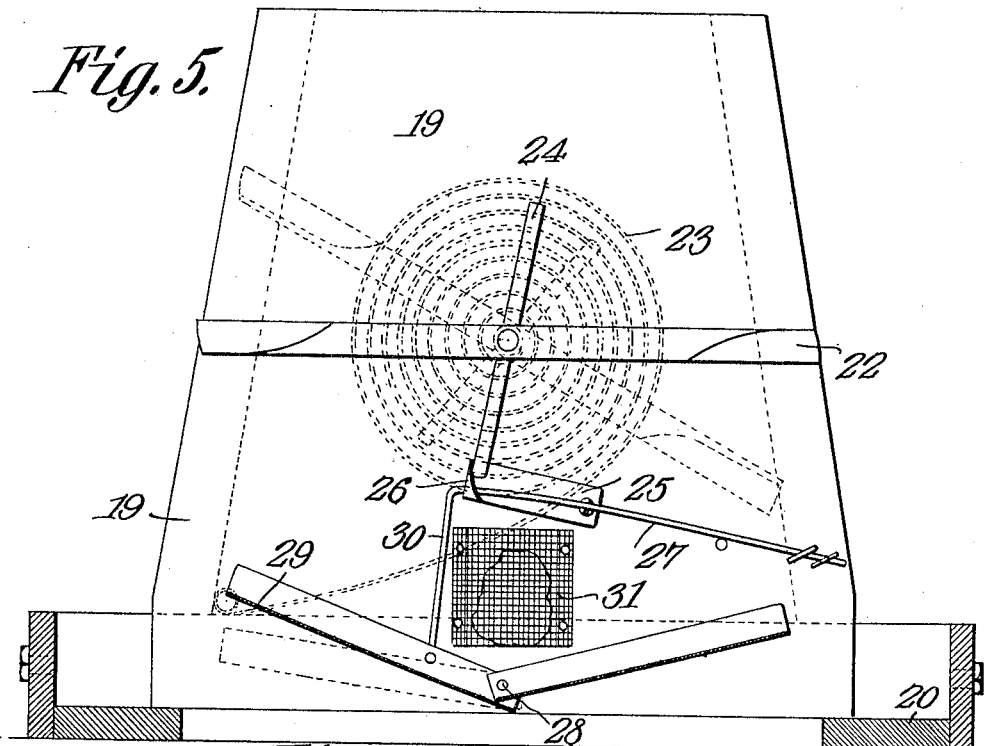
Figure 4:
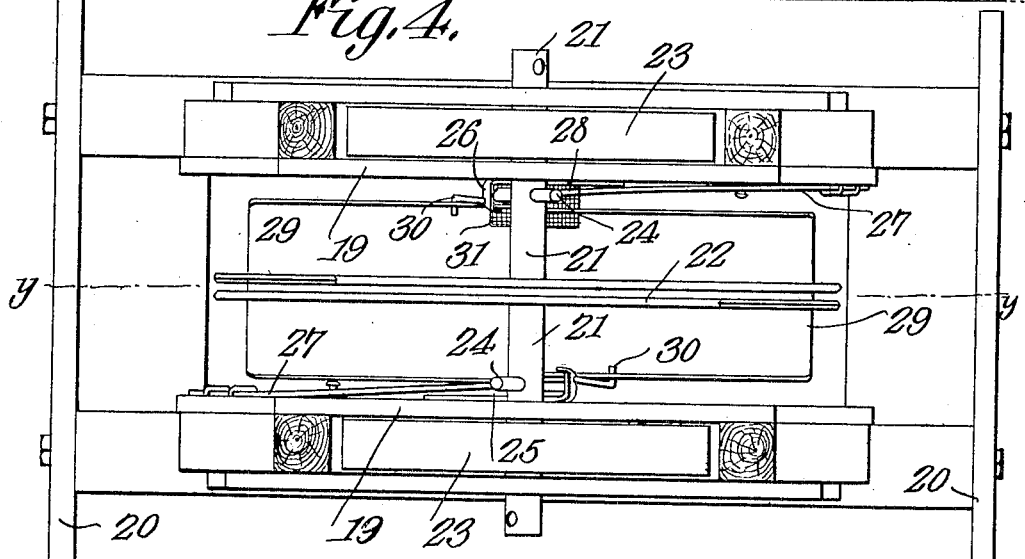

In said drawings: Figure 1 is a top plan view of the trap; Fig. 2 is a bottom plan view thereof; Fig. 3 is a section on line $x$—$x$, Fig. 1; Fig. 4 is a plan view of a modified form of trap; and Fig. 5 is a section on line $y$—$y$, Fig. 4.

Referring to the figures by characters of reference, 1 is the platform of the trap the same being supported upon side strips 2. This platform is preferably rectangular in contour and has a cross strip 3 supported thereabove and disposed diagonally, said cross strip being mounted at its ends on standards 4 and carrying a hood 5 at the center thereof which is at right angles to the strip 3. A projection 6 is located within the hood and is adapted to engage any suitable bait placed therein. The hood is open only at the ends so that the bait is clearly visible to an animal located adjacent either end of the hood. Rotatably mounted within the platform and directly below the center of the hood 5 is a vertical shaft 7 which projects above and below the platform, the upper end thereof having oppositely extending knife blades 8 adapted to swing in a circle above the platform when the shaft 7 is rotated. A holding arm 9 is also secured to this upwardly projecting portion of the shaft and rotates with it. This arm is adapted to contact with either of two oppositely disposed stop plates 10 connected to the upper ends of levers 11 which are fulcrumed within slots formed in the platform. Each plate 10 has a tripping plate 12 extending laterally therefrom and a spring 13 exerts a constant inward pressure against the upper end of each lever 11 so that said ends of the levers are normally in the path of the arm 9.

The outer ends of the stop plates 10 have downwardly projecting fingers 13' each of which is connected with the lower end of the adjoining lever 11 by a brace wire or rod 14. Another rod 15 is pivotally connected to the lower portion of the lever 11 and these two rods are pivoted to opposite portions of a lever 16 fulcrumed at its center upon the lower portion of the shaft 7. It is therefore obvious that when the outer end of one of the tripping plates 12 is pressed downward, as when an animal places its weight thereon, said plate will cause the lever 11 connected to it to swing against the rod 15 and cause lever 16 to partly rotate on shaft 7, thereby producing a movement of the other tripping plate which exactly corresponds with the movement of the depressed plate. If therefore the arm 9 is in contact with one of the plates 10 said arm can be released by depressing either of the tripping plates thereby causing the upper end of the lever 11 holding said arm to swing backward out of the path thereof.

In order that proper movement of the shaft will occur when arm 9 is released a heavy coiled spring 17 is placed around the shaft 7 below the platform 1 and is secured at opposite ends to the shaft and platform. By depressing one of the tripping plates so as to withdraw the levers 11 from the path of the arm 9 the shaft 7 can be readily rotated manually so as to tension the spring 7 after which the tripping plates can be released so as to be sprung inward into the path of the arm 9 by the springs 13, thereby holding shaft 7 and knives 8 against rotation.

It is thought that the operation of this trap will be fully understood in view of the foregoing description and the accompanying illustrations. The bait within the hood 5 will attract an animal to the trap and as the bait can only be reached by an animal first placing its weight on one of the tripping plates 12 it is apparent that as soon as its weight is applied both plates will be moved outward swinging the stop plates 10 and the levers 11 out of the path of arm 9. As soon as this arm is released the tension spring will throw the arms around one half a revolution and one of the knives will strike the animal before it has time to leave the tripping plate and will not only cut but will throw it by reason of the force of the blow to some distance from the trap. As soon as the weight of the animal is removed from the trap both of said plates will be returned to their normal positions and therefore the rotation of the knives is stopped and the trap is reset. This operation of the trap will continue as long as the spring remains under tension.

In order that the levers 11 may be reinforced against the lateral strain exerted upon them by the rod 15 during the operation of the trap reinforcing brackets 18 are preferably secured to the bottom of the platform and bear against the adjoining faces of the levers.

Instead of the construction described the trap may be provided with cutting knives disposed in vertical planes as in Figs. 4 and 5. With this construction side walls 19 extend upward to a suitable height and are connected at their ends by cross strips 20. Alining shafts 21 are rigidly mounted within the walls and terminate close to each other, said shafts being provided at their adjacent ends with oppositely extending knives 22. A coiled spring 23 is arranged around the outer portion of each shaft and is connected at its ends to the shaft and to the wall respectively and these springs are adapted when tensioned to cause the shafts to rotate in opposite directions. Each shaft has oppositely extending arms 24 thereon close to the walls 19 said arms being disposed substantially at right angles to the knives. A locking plate 25 is pivoted upon the inner face of this wall and has an outstanding projection 26 which is held normally in the path of the arms 24 by a spring 27. A rod 28 connects the walls at their lower ends and adjacent the centers and pivotally mounted on this rod are oppositely extending tripping plates 29. One of these plates is connected by a rod 30 with one of the projections 26 and the other tripping plate is similarly connected to the other projection 26. A basket 31 is located upon one of the walls directly above the rod 28 and is adapted to hold bait. The springs are adapted to be tensioned by depressing the tripping plates 29 so as to remove the projections 26 from the paths of the arms 24. The shafts 21 can then be rotated so as to tension the springs and by releasing the tripping plates the projections 26 will return into the path of the arms 24 and hold them. Should an animal approach the bait from the left of the trap shown in Fig. 5 it will be necessary for it to place its weight upon the tripping plate 29 in order to reach the bait. As soon as this tripping plate is depressed the arm 24 of one of the sets of knives is released and the knives will be thrown downward toward the animal as shown by the arrow in Fig. 5 cutting into it and throwing it from the trap. As soon as the weight of the animal is removed from the tripping plate the projection 26 will spring back into the path of arms 24 and reset the trap. The other knives will operate in a similar manner when the other tripping plate is depressed. The trap shown in Figs. 4 and 5 can be made to kill animals of different sizes by detaching the cross strip 20 and moving the side walls toward or from each other.

The preferred form of the invention has been set forth in the foregoing description but I do not limit myself thereto as I am aware that modifications may be made therein without departing from the spirit or sacrificing the advantages thereof, and I therefore reserve the right to make such changes as fairly fall within the scope of the claims.

What is claimed is:

1. In a trap the combination with rotatable knives and means for actuating the same; of means for holding the knives against movement, and oppositely disposed simultaneously movable tripping devices for releasing said means.

2. In a trap the combination with rotatable knives and means for imparting movement thereto; of an arm movable with the knives, a holding device in the path of the arm, and simultaneously movable tripping devices for actuating the holding device.

3. A trap comprising spring actuated rotatable knives, an arm rotatable therewith, a pivoted holding device in the path of the arm and constituting a stop therefor, and simultaneously movable tripping devices for withdrawing the stop from the path of the arm.

4. A trap comprising rotatable knives, means for rotating the knives, an arm movable with the knives, a holding device in the path of the arms and constituting a stop therefor, and oppositely extending simultaneously depressible tripping devices connected to the holding device for withdrawing the same from the path of the arm.

5. In a trap the combination with rotatable knives and a spring for actuating them; of means for normally holding the knives against rotation, oppositely extending tripping devices for releasing said means, and a bait holder interposed above and adjacent the tripping devices.

6. In a trap the combination with rotatable devices and a spring for actuating them; of oppositely extending holding devices, an arm movable with the rotatable devices and adapted to be stopped by either of the holding devices, means for moving said holding devices out of the path of the arm simultaneously, and depressible tripping devices carried by said holding devices.

In testimony that I claim the foregoing as my own, I have hereto affixed my signature in the presence of two witnesses.

CHARLES F. LAMP.

Witnesses:
   D. H. SNOKE,
   HENRY ROHLFS.